(12) United States Patent
Lausterer et al.

(10) Patent No.: US 7,661,073 B2
(45) Date of Patent: Feb. 9, 2010

(54) USER INTERFACE OF A MACHINE TOOL

(75) Inventors: Stephen Lausterer, Wannweil (DE); Klaus Bauer, Ditzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 10/550,078

(22) PCT Filed: Mar. 11, 2004

(86) PCT No.: PCT/EP2004/002478

§ 371 (c)(1), (2), (4) Date: Jun. 7, 2006

(87) PCT Pub. No.: WO2004/084165

PCT Pub. Date: Sep. 30, 2004

(65) Prior Publication Data

US 2007/0113199 A1    May 17, 2007

(30) Foreign Application Priority Data

Mar. 17, 2003    (EP)    .................................. 03005919

(51) Int. Cl.
*G06F 3/048*    (2006.01)
*G06F 19/00*    (2006.01)

(52) U.S. Cl. .................... 715/810; 700/180; 715/777; 715/841

(58) Field of Classification Search ................ 715/810, 715/845, 841, 777; 700/180
See application file for complete search history.

(56) References Cited

U.S. PATENT DOCUMENTS 5,079,723 A * 1/1992 Herceg et al. ................ 715/810

(Continued)

FOREIGN PATENT DOCUMENTS

DE    19515198    10/1996

(Continued)

OTHER PUBLICATIONS

International Search Report from corresponding PCT Application No. PCT/EP2004/002478, mailed Oct. 21, 2004, 3 pages.

*Primary Examiner*—Ting Lee
*Assistant Examiner*—Ashraf Zahr
(74) *Attorney, Agent, or Firm*—Fish & Richardson P.C.

(57) ABSTRACT

A user interface of a machine tool includes a display that is divided into at least a first display region and a second display region. The first display region permanently displays a main menu, and the main menu includes a menu bar that provides a selection of different main modes of the user interface. Each main mode is associated with a main window that is opened in the second display region when a main mode is selected in the main menu. At least one of the main windows includes a permanently displayed submenu that provides selection of different submodes, with each submode being associated with a subwindow that is opened when an associated submode is selected. One or more of the main windows and the subwindows include input fields. The user interface also includes an input unit for selecting the individual modes and for processing the input fields provided in a window. The display permanently displays which one of the main modes is selected.

25 Claims, 3 Drawing Sheets

U.S. PATENT DOCUMENTS

| | | | |
|---|---|---|---|
| 5,526,273 A * | 6/1996 | Borsari et al. | 700/180 |
| 5,576,946 A * | 11/1996 | Bender et al. | 700/17 |
| 5,933,353 A * | 8/1999 | Abriam et al. | 700/182 |
| 5,997,169 A * | 12/1999 | Watanabe et al. | 700/83 |
| 6,112,133 A * | 8/2000 | Fishman | 700/182 |
| 6,185,476 B1 * | 2/2001 | Sakai | 700/182 |
| 6,236,399 B1 * | 5/2001 | Nishiyama et al. | 715/810 |
| 6,384,850 B1 * | 5/2002 | McNally et al. | 715/810 |
| 6,389,325 B1 * | 5/2002 | Rutkowski | 700/180 |
| 6,407,760 B1 * | 6/2002 | Aritomi | 715/810 |
| 6,944,829 B2 * | 9/2005 | Dando | 715/798 |
| 6,954,676 B2 * | 10/2005 | Dorsch | 700/95 |
| 7,000,187 B2 * | 2/2006 | Messinger et al. | 715/705 |

FOREIGN PATENT DOCUMENTS

| | | |
|---|---|---|
| DE | 10056731 | 5/2002 |
| EP | 0858016 | 8/1998 |
| WO | WO 90/00273 | 1/1990 |

* cited by examiner

USER INTERFACE OF A MACHINE TOOL

TECHNICAL FIELD

The description relates to a user interface of a machine tool.

SUMMARY

In one general aspect, a user interface includes a display that is divided into at least a first display region and a second display region. The first display region permanently displays a main menu, and the main menu includes a menu bar that provides selection of different main modes of the user interface. Each main mode is associated with a main window that is opened in the second display region when a main mode is selected in the main menu. At least one of the main windows includes a permanently displayed submenu that provides selection of different submodes, with each submode being associated with a subwindow that is opened when an associated submode is selected. The user interface includes an input unit for selecting the individual modes and for processing the input fields provided in a window. The display permanently displays which one of the main modes is selected.

The user interface is configured in an activity-oriented manner, that is, information and functions are displayed on the user interface in such a manner that the activity of the user is displayed thereon. The user interface shows the information or functions that are required to fulfil the current task. And, this information is displayed oriented on the usual workflow. The user obtains access to the essential functionality of the machine through and using so-called main modes (main activities) that are permanently displayed on the display. The submodes (side activities) are oriented on the workflow (working process) of the respective main mode.

Main modes are, for example, production, setting, programming, technology, maintenance and start-up, diagnosis, and help. For instance, in a pipe bending machine, the submodes of the main mode "setting" are, for example, functional modules, individual functions, and preparations. The submodes of the main mode "programming" are bending part, pipe geometry, pipe data, tools, process flow, and corrections. The submodes of the main mode "technology" are, for example, pipe data, tool catalogue, and resqueezing. The submodes of the main mode "maintenance and start-up" are, for example, maintenance overview, maintenance plan, machine parameters, and machine options. The submodes of the main mode "diagnosis" are, for example, upcoming messages, message history, E/A monitor and software versions, and the submodes of the main mode "help" are, for example, machine view, bending technology, manual, and spare part list.

One advantage of the user interface is that the user can always see in which main mode and submode he/she is at the moment due to the permanently displayed main menu with emphasized selected main mode, and due to the permanently displayed submenu. Moreover, the user can change from each window of a main mode to a different main window by selecting a main mode in the permanently displayed main menu. In this way, the user interface described herein has improved clarity.

The selected main mode may be marked, for example, be emphasized in a graphical or different manner in the main menu.

If required, a subwindow may include a permanently displayed sub-submenu for selecting different sub-submodes of the selected submode, and a sub-subwindow that is opened in response to the selected sub-submode.

Implementations can include one or more of the following features. For example, at least one of the windows may include a navigation menu for selecting different navigation modes each graphically representing a region of the machine tool. A navigation window is opened within the associated window in accordance with the selected navigation mode. The navigation menu, being a display-related access, may be based on a realistic illustration of the physical machine or machine part regions, and is used, for example, to select machine regions to be subjected to certain activities or settings. The realistic illustration permits direct transfer between the actual machine and the software, which permits efficient operation with little learning effort. Even special options, which may be contained due to customer-specific adjustments of the machine, can be selected through lists using the display-related access.

The subwindow, sub-subwindow, or navigation window, which was opened before switching-over to a different main mode, may be opened when returning into the original main mode. If the user changes the main mode while, for example, a subwindow is opened, this subwindow will still be open when he/she returns into the original main mode with the result that the user can switch-over to different main modes even when the subwindow is opened. In this case, the user can switch. for example, from each position over to the main mode "diagnosis" to analyse possibly issued alarm or warning messages to switch-over to the main mode "help" without having to close the windows concerned. In this manner, the user can even program a new part while automatic production is running. He/she can thereby change between the main modes "production" and "programming" without causing any interaction between them.

At least one of the windows may include at least one activity button, which is associated with an activity button window, for processing input fields provided therein. The activity button windows have the advantage that the action initiated through activation of the activity button must either be deliberately terminated by the operator or be continued to the end. When the activity button window is closed, the program returns to the window in which the activity button window was opened. The activity buttons can directly perform functions or start a corresponding subdialogue.

Switching-over to a different window of the same main mode may be blocked when an activity button window is opened. Thus, when an activity button window is opened, no other windows of the main mode associated with the activity button window can be processed.

The sequence of the individual submodes, sub-submodes, and navigation modes within one main mode is preferably oriented on the workflow of the machine tool. If a submenu is disposed in a horizontal direction as a tab, the access to the submode to be executed at first is shown on the tab on the very left. With the user progressing through the workflow, the corresponding tabs are further to the right hand side.

At least the submenus and/or the sub-submenus may be designed as tab menu bars.

The display and the input unit may be formed by a touch screen and navigation through the user interface is effected through touch screen operation. To ensure failure-free operation, navigation using keyboard and mouse is optionally possible.

Further advantages of the user interface can be extracted from the description, the drawings, and the claims. The features mentioned above and below can be used individually or collectively in arbitrary combination. The implementations shown and described are not to be understood as exhaustive enumeration but have exemplary character for describing the user interface.

DESCRIPTION OF THE DRAWINGS

Like reference symbols in the various drawings may indicate like elements.

DETAILED DESCRIPTION

Figure 1:
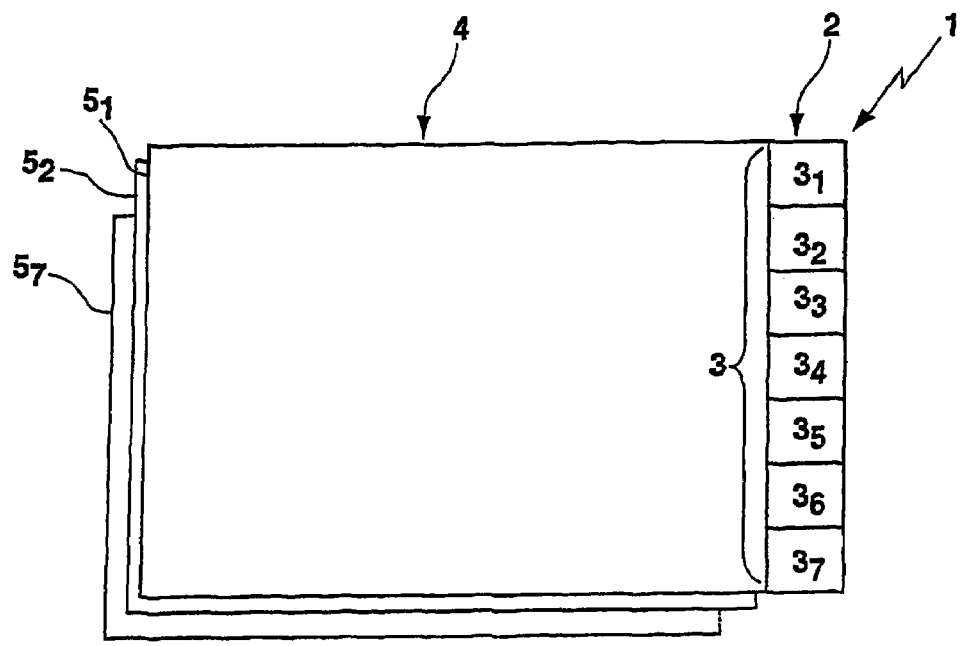
FIGS. 1 through 6 show different displays of a user interface for a machine tool.

Referring to FIG. 1, a display 1 of a user interface of a machine tool is shown. The display 1 is divided into a right-hand display region 2, which displays a main menu 3 for selecting, for example, seven different main modes $3_1$ to $3_7$ of the user interface, and a left-hand display region 4. In the left-hand display region 4 different main windows $5_1$ to $5_7$ are opened one at a time depending on the main mode selected in the main menu 3. The main menu 3 is designed as a vertical menu bar that is permanently displayed. The vertical menu bar of the main menu 3 includes a set of selectable main modes $3_1$ to $3_7$, with each main mode corresponding to a different main activity of the machine tool, such as, for example, production, setting, programming, maintenance/start-up/diagnosis.

As shown in FIG. 1, the main window $5_1$ associated with the main mode $3_1$ is opened. Because the main window $5_1$ is a pure display window, it includes no submenu or data fields to be selected or filled in by the operator.

Figure 2:
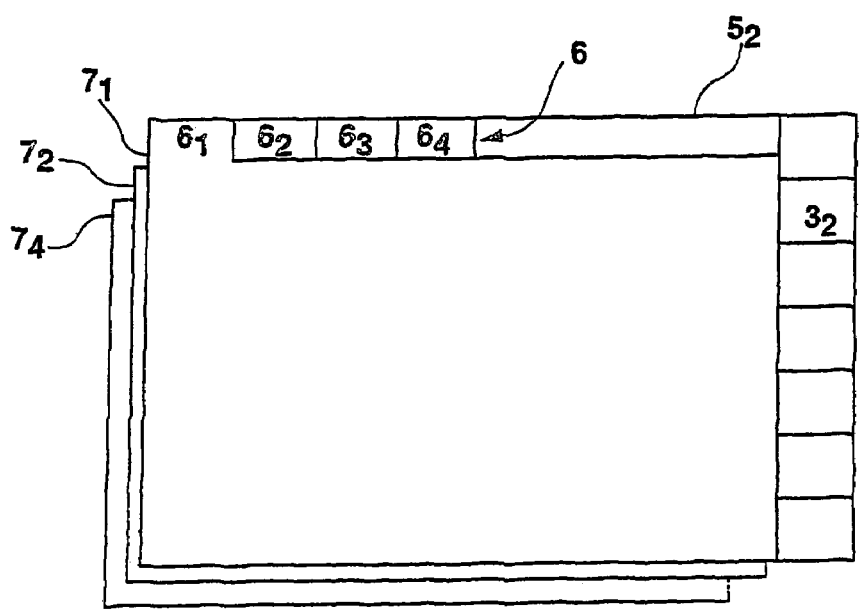

Referring to FIG. 2, the main window $5_2$ associated with the main mode $3_2$ is opened. At the top of the main window $5_2$, a submenu 6 having the form of a horizontal tab menu bar is permanently displayed for selecting, for example, four different submodes $6_1$ to $6_4$ of the selected main mode $3_2$. A subwindow $7_1$ to $7_4$ is associated with each submode $6_1$ to $6_4$ such that a subwindow is opened if its associated submode is selected. In the example shown in FIG. 2, the submode $6_1$ is selected and the associated subwindow $7_1$ is therefore opened. If the user changes from the selected (original) main mode $3_2$ to another main mode while the subwindow $7_1$ is opened, the subwindow $7_1$ will still be open when he/she returns to the original main mode $3_2$.

Figure 3:
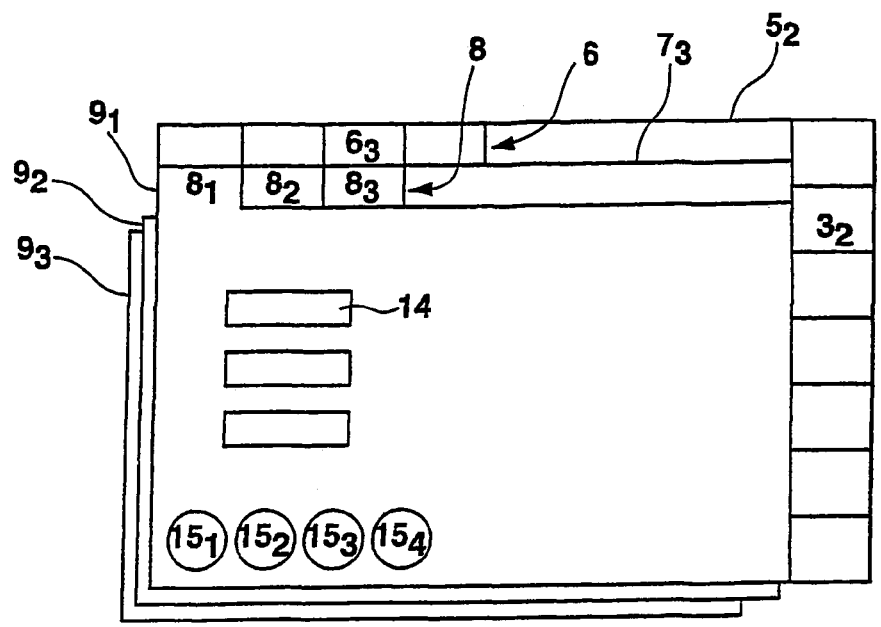

Referring to FIG. 3, both the main window $5_2$, which is associated with the main mode $3_2$, and its subwindow $7_3$, which is associated with the submode $6_3$, are opened. The subwindow $7_3$ permanently shows a sub-submenu 8 in the form of a horizontal tab menu bar for selecting, for example, three different sub-submodes $8_1$ through $8_3$ of the selected submode $6_3$. A sub-subwindow $9_1$ to $9_3$ is associated with each sub-submode $8_1$ to $8_3$ such that a sub-subwindow is opened if its associated sub-submode is selected. In the example shown in FIG. 3, the sub-submode $8_1$ is selected and hence the associated sub-subwindow $9_1$ is opened.

Figure 4:
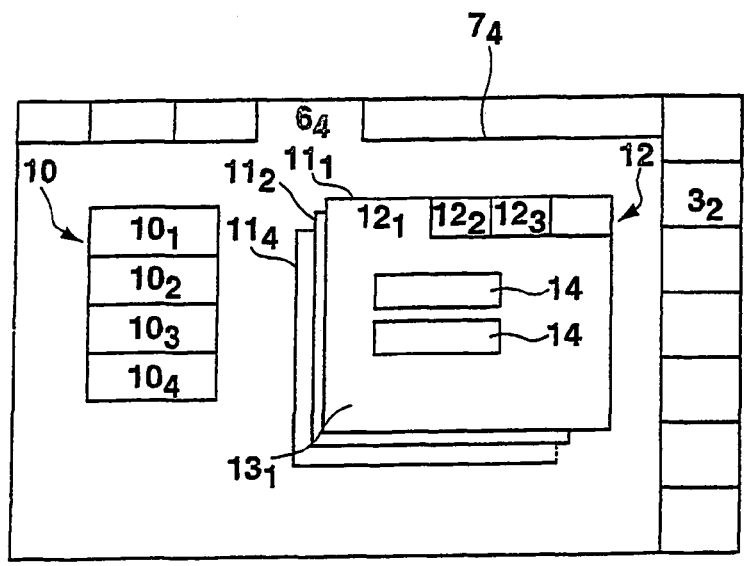

Referring to FIG. 4, both the main window $5_2$, which is associated with the main mode $3_2$, and its subwindow $7_4$, which is associated with the submode $6_4$, are opened. The permanent display on the left in the subwindow $7_4$ shows a navigation menu 10 in the form of a vertical menu bar for selecting, for example, four different navigation modes $10_1$ to $10_4$ of the selected submode $6_4$, and to the right of the navigation menu 10 a navigation window $11_1$ to $11_4$ that is opened when an associated navigation mode is selected. In the embodiment shown, the navigation mode $10_1$ is selected and therefore, the associated navigation window $11_1$ is opened. The navigation window $11_1$ includes at the top a navigation submenu 12 in the form of a horizontal tab menu bar for selecting, for example, four different navigation submodes $12_1$ to $12_3$. A navigation subwindow is associated with each navigation submode $12_1$ to $12_3$—such that a navigation subwindow is opened if its associated navigation submode is selected. As shown, the navigation submode $12_1$ is selected and the navigation subwindow $13_1$ is correspondingly opened. The individual navigation modes $10_1$ through $10_4$ each represent a region of the machine tool graphically.

Unless they are pure display windows, the main windows $5_1$ through $5_7$, the subwindows $7_1$ to $7_4$, the sub-subwindows $9_1$ to $9_3$, the navigation windows $11_1$ to $11_4$, and the navigation subwindows have input fields 14 that can be filled in by the operator. As is shown in FIG. 3, activity buttons $15_1$ to $15_4$ are provided on the lower edge of the sub-subwindow $9_1$, and the activity buttons support processing of the input fields 14 provided in the sub-subwindow $9_1$. The activity buttons may be, for example, "create new data", "process existing data", "delete existing data", and "import data".

Figure 5:
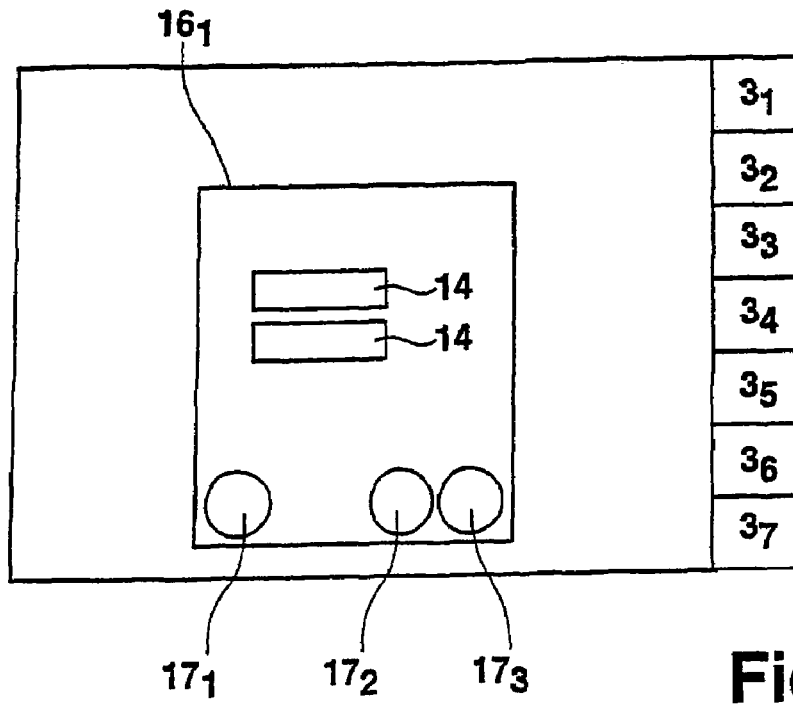

Each activity button is associated with an activity button window. The activity button window $16_1$ of the activity button $15_1$ is exemplarily shown in FIG. 5, and has further activity buttons $17_1$ to $17_3$ in addition to the input fields 14, which have the functions "assistant", "take over the input data", and "terminate".

Figure 6:
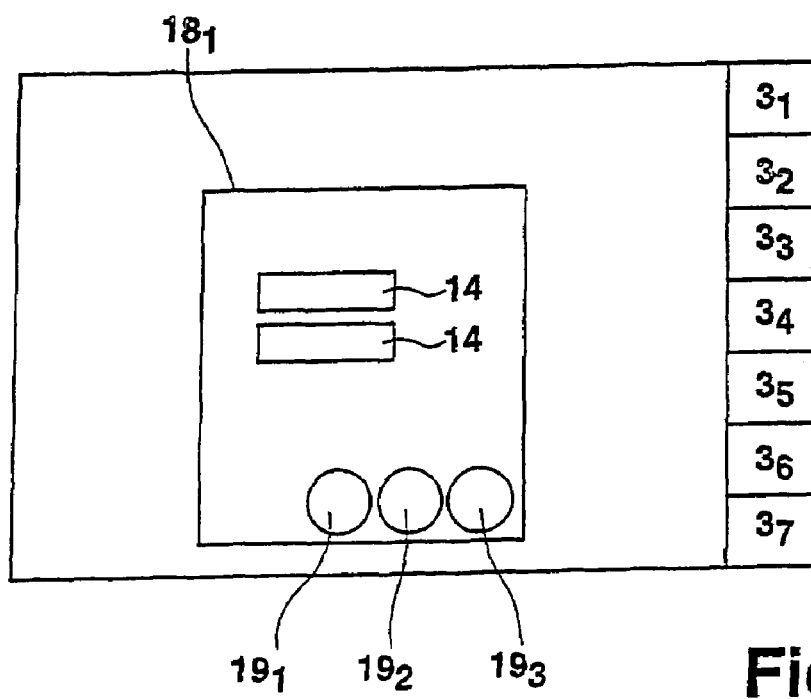

Upon activation of the assistant, that is, of the activity button $17_1$, the assistant window $18_1$ shown in FIG. 6 opens. The assistant window $18_1$ includes, in addition to input fields 14, further activity buttons $19_1$ to $19_3$ with the functions "assistant forward", "assistant backward", and "terminate". The function "assistant forward" permits activation of a further assistant field, and the function "assistant backward" permits activation of the respectively preceding assistant window. The assistant thereby permits navigation of the user when entering the required data.

When the activity button window $16_1$, $18_1$ is opened, change to a different window of the same main mode is blocked, and therefore no other windows of the main mode associated with the activity button window can be processed. Closing of the activity button window is followed by return to the window, in which the activity button window was opened. The activity button windows $16_1$, $18_1$ have the advantage that the action initiated through activation of an activity button must either be deliberately terminated by the operator or continued to the end.

In addition to the display regions 2, 4 shown in the drawings, further display regions may be provided, such as, for example, an information window that displays, for example, a user name, warnings, etc.

Other implementations are within the scope of the following claims.

The invention claimed is:

1. A user interface of a machine tool, the user interface comprising:
   a display that is divided into at least a first display region and a second display region,
   wherein the first display region permanently displays a main menu that comprises a plurality of permanently displayed menu-fields for selecting different main activity modes of the machine tool, wherein each menu-field corresponds to one of the main activity modes of the machine tool,
   wherein each main activity mode is associated with a main window such that a respective main window is opened in the second display region when the menu-field of the associated main activity mode is selected in the main menu, wherein the main windows are displayed one at a time depending on the main activity mode selected in the main menu, wherein at least one of the main windows comprises a submenu comprising a plurality of submenu-fields for selecting subitems, each submenu-field corresponding to a different subitem of the main activity associated to said main window, wherein the submenu-fields are permanently displayed in said main window, when the respective main window is opened, and, each submenu-field is associated with a subwindow such that the subwindow is opened in said main window when its associated submenu-field is selected, and wherein one or more of the main windows and the subwindows include input fields; and an input unit for selecting the individual menu-fields and submenu-fields and for processing the input fields provided in a window, wherein the first display region permanently displays which one of the main activity modes of the machine tool is selected, and wherein, if in an original main activity mode, a particular subwindow was opened and a user switched from the original main activity mode to another main activity mode, then if the user switches back to the original main activity mode, the particular subwindow is opened upon return into the original main activity mode.

2. The user interface of claim 1, wherein the menu-field of the selected main activity mode is marked in the main menu.

3. The user interface of claim 1, wherein at least one of the subwindows comprises a permanently displayed sub-submenu for selecting different sub-submodes of a selected submode and a sub-subwindow associated with each sub-submode such that a sub-subwindow is opened when its associated sub-submode is selected.

4. The user interface of claim 3, wherein at least one of the main windows, the subwindows, or the sub-subwindows comprises:

a navigation menu for selecting different navigation modes that each graphically represent a region of the machine tool, and a navigation window associated with each navigation mode such that a navigation window is opened within the at least one main window, subwindow, or sub-subwindow when its associated navigation mode is selected.

5. The user interface of claim 3, wherein if, in an original main activity mode, a particular sub-subwindow or navigation window was opened, and a user switched from the original main activity mode to another main activity mode, if the user switches back to the original main activity mode from the other main activity mode, the particular sub-subwindow or navigation window is opened upon return into the original main activity mode.

6. The user interface of claim 4, wherein a sequence of the individual submodes, sub-submodes, and navigation modes within one main activity mode is oriented on the workflow of the machine tool.

7. The user interface of claim 3, wherein at least one of the main windows, the subwindows, or the sub-subwindows comprises at least one activity button for processing input fields provided therein, in which each activity button is associated with an activity button window.

8. The user interface of claim 7, wherein when an activity button window is opened, switching-over to a different main window, subwindow, or sub-subwindow of the same main activity mode is blocked.

9. The user interface of claim 3, characterized in that at least one of the submenus and the sub-submenus is designed as tab menu bar.

10. The user interface of claim 1, wherein the display and the input unit are formed by a touch screen.

11. The user interface of claim 1, wherein at least one of the main windows or the subwindows comprises:

a navigation menu for selecting different navigation modes that each graphically represent a region of the machine tool; and a navigation window associated with each navigation mode such that a navigation window is opened within at least one main window or subwindow when its associated navigation mode is selected.

12. The user interface of claim 1, wherein at least one of the main windows or the subwindows comprises at least one activity button for processing input fields provided therein, in which each activity button is associated with an activity button window.

13. The user interface of claim 1, wherein the main menu is displayed as a menu bar.

14. The user interface of claim 1, wherein the main activity modes include at least one of production, setting, programming, maintenance, start-up, and diagnosis.

15. A method of interfacing with a user of a machine tool, the method comprising:

displaying a first display region in a display;

displaying a second display region in the display;

permanently displaying a main activity menu in the first display region, wherein the main activity menu comprises a plurality of menu-fields for selecting different main activity modes of the machine tool, wherein the menu-fields are permanently displayed in the main menu for selection, and wherein each main activity mode is associated with a main window such that the main window is opened in the second display region when its associated menu-field is selected in the main menu;

opening the main windows in the second display region one at a time depending on the menu-field selected in the main menu;

permanently displaying a submenu in at least one of the main windows, when said main window is opened, wherein the submenu comprises a plurality of submenu-fields for selecting subitems, each submenu-field corresponding to a different subitem of the main activity that corresponds to the main activity mode associated to said main window and associated with a subwindow such that the subwindow is opened in said main window when its associated submenu-field is selected;

opening a subwindow when its associated submenu-field is selected;

displaying input fields in one or more of the main windows and the subwindows;

enabling selection of one or more of a main activity mode or a submode through an input unit;

processing the input fields at the input unit;

permanently displaying in the first display region which menu-field of the main activity modes is selected;

opening a particular subwindow in an original main activity mode;

receiving a selection to switch from the original main activity mode to another main activity mode;

receiving a selection to switch from the other main activity mode back to the original main activity mode; and opening the particular subwindow upon return to the original main activity mode.

16. The method of claim 15, further comprising marking the menu-field of the selected main activity mode in the main menu.

17. The method of claim 15, further comprising:

permanently displaying in at least one of the subwindows a sub-submenu that enables selection of different sub-submodes of a selected submode;

associating with each sub-submode a sub-subwindow; and opening a sub-subwindow when its associated sub-submode is selected.

18. The method of claim 17, further comprising:

opening a particular sub-subwindow or navigation window in an original main activity mode; and receiving a selection to switch from the original main activity mode to another main activity mode;

receiving a selection to switch from the other main activity mode back to the original main activity mode; and opening the particular sub-subwindow or navigation window upon return to the original main activity mode.

19. The method of claim 17, further comprising:

presenting an activity button in at least one of the main windows, the subwindows, or the sub-subwindows, wherein an activity button supports processing of input fields provided in the at least one main window, subwindow, or sub-subwindow; and associating each activity button with an activity button window.

20. The method of claim 19, further comprising blocking switching to a different main window, subwindow, or sub-subwindow of a main activity mode when an activity button window is opened.

21. The method of claim 17, further comprising designing at least one of the submenus or sub-submenus as a tab menu bar.

22. The method of claim 15, further comprising:

presenting a navigation menu having different navigation modes in at least one of the main windows, the subwindows, or the sub-subwindows, wherein each navigation mode represents a region of the machine tool;

associating a navigation window with each navigation mode; and opening a navigation window within the at least one main window, subwindow, or sub-subwindow when its associated navigation mode is selected.

23. The method of claim 15, wherein the main activity modes include at least one of production, setting, programming, maintenance, start-up, and diagnosis.

24. A user interface of a machine tool, the user interface comprising:

a display that is divided into at least a first display region and a second display region, wherein the first display region permanently displays a main menu that comprises a plurality of permanently displayed menu-fields for selecting different main activity modes of the machine tool, wherein each menu-field corresponds to one of the main activity modes of the machine tool, wherein each main activity mode is associated with a main window such that a respective main window is opened in the second display region when the menu-field of the associated main activity mode is selected in the main menu, wherein the main windows are displayed one at a time depending on the main activity mode selected in the main menu, wherein at least one of the main windows comprises a submenu comprising a plurality of submenu-fields for selecting subitems, each submenu-field corresponding to a different subitem of the main activity associated to said main window, wherein the submenu-fields are permanently displayed in said main window, when the respective main window is opened, and, each submenu-field is associated with a subwindow such that the subwindow is opened in said main window when its associated submenu-field is selected, and wherein one or more of the main windows and the subwindows include input fields; and an input unit for selecting the individual menu-fields and submenu-fields and for processing the input fields provided in a window, wherein the menu-field of the selected main activity mode is permanently marked in the permanently displayed main menu, and wherein, if in an original main activity mode, a particular subwindow was opened and a user switched from the original main activity mode to another main activity mode; then, if the user switches back to the original main activity mode, the particular subwindow is opened upon return into the original main activity mode, and wherein at least one of the main windows and the subwindows comprises at least one activity button for processing input fields provided therein, in which each activity button is associated with an activity button window, wherein when said activity button window is opened by selection of the associated activity button, switching-over to a different subwindow of the same main activity mode is blocked.

25. A method of interfacing with a user of a machine tool, the method comprising:

displaying a first display region in a display;

displaying a second display region in the display;

permanently displaying a main activity menu in the first display region, wherein the main activity menu comprises a plurality of menu-fields for selecting different main activity modes of the machine tool, wherein the menu-fields are permanently displayed in the main menu for selection, and wherein each main activity mode is associated with a main window such that the main window is opened in the second display region when its associated menu-field is selected in the main menu;

displaying opening the main windows in the second display region one at a time depending on the menu-field selected in the main menu;

permanently displaying a submenu in at least one of the main windows, when said main window is opened, wherein the submenu comprises a plurality of submenu-fields for selecting subitems, each submenu-field corresponding to a different subitem of the main activity that corresponds to the main activity mode associated to said main window and associated with a subwindow such that the subwindow is opened in said main window when its associated submenu-field is selected;

opening a subwindow when its associated submenu-field is selected;

displaying input fields in one or more of the main windows and the subwindows;

enabling selection of one or more of a main activity mode or a submode through an input unit;

processing the input fields at the input unit;

permanently marking the menu-field of the selected main activity mode in the permanently displayed main menu;

opening a particular subwindow in an original main activity mode;

receiving a selection to switch from the original main activity mode to another main activity mode;

receiving a selection to switch from the other main activity mode back to the original main activity mode; and opening the particular subwindow upon return to the original main activity mode, and presenting an activity button in at least one of the main windows and subwindows, wherein an activity button supports processing of input fields provided in at least on main window or subwindow and associating each activity button with an activity button window that is opened by selection of the associated activity button, and blocking switching to a different subwindow of the same main activity mode, when the activity button window is opened.

* * * * *

UNITED STATES PATENT AND TRADEMARK OFFICE
CERTIFICATE OF CORRECTION

PATENT NO. : 7,661,073 B2 Page 1 of 1
APPLICATION NO. : 10/550078
DATED : February 9, 2010
INVENTOR(S) : Stephan Lausterer and Klaus Bauer It is certified that error appears in the above-identified patent and that said Letters Patent is hereby corrected as shown below:

On the Title page, Item [75] please delete "Stephen Lausterer, Wannweil (DE)" and insert
--Stephan Lausterer, Wannweil (DE)--.

Signed and Sealed this

Sixth Day of April, 2010

David J. Kappos
*Director of the United States Patent and Trademark Office*